Dec. 22, 1964   N. J. LEFEBVRE   3,162,474
HOLDER FOR A STRAINER OR FILTER
Filed July 15, 1963   2 Sheets-Sheet 1

INVENTOR.
NORBERT J. LEFEBVRE
BY Joseph G. Werner
ATTORNEY

Dec. 22, 1964   N. J. LEFEBVRE   3,162,474
HOLDER FOR A STRAINER OR FILTER
Filed July 15, 1963   2 Sheets-Sheet 2

INVENTOR.
NORBERT J. LEFEBVRE
BY Joseph S. Werner
ATTORNEY 3,162,474
HOLDER FOR A STRAINER OR FILTER
Norbert J. Lefebvre, 625 S. Jackson St., Green Bay, Wis.
Filed July 15, 1963, Ser. No. 294,983
2 Claims. (Cl. 294—16)

My invention relates to an improved holder for a strainer or a filter.

One object of my invention is to provide a strainer holder in which the strainer may be quickly and easily replaced. Another object of my invention is to provide a strainer holder which is sturdy and which may be economically manufactured.

Another object of my invention is to provide a strainer holder which may be used with strainers of almost any material. A further object of my invention is to provide a manually operated strainer holder which is compact and conveniently storable.

Other objects and advantages of my invention will be apparent from the following detailed description taken in conjunction with the accompanying drawings wherein preferred embodiments of the principles of the invention have been selected for exemplification.

Broadly my strainer holder 10 consists of the two rings 11 and 12 and the handle 13. A strainer of any desired construction or material is clamped between the two rings 11 and 12. Clamping pressure is applied to the rings 11 and 12 by the spring action of the handle 13.

Figure 1:
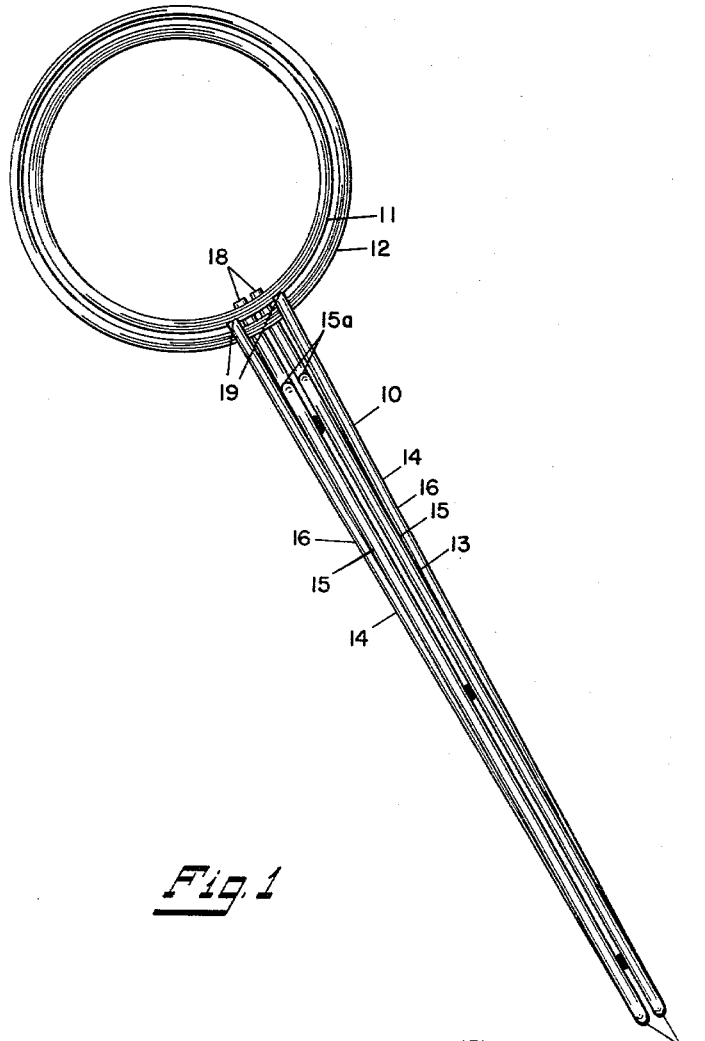
FIG. 1 is a top plan view of my novel strainer holder.
Figure 2:
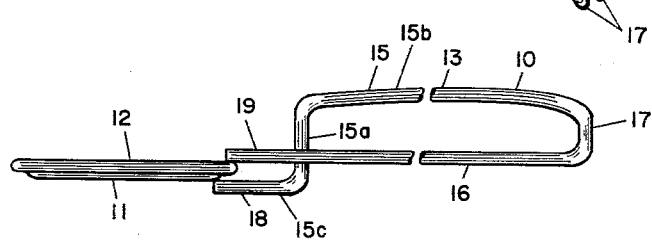
FIG. 2 is a side view of the holder of FIG. 1.

As shown in FIGS. 1 and 2, the handle 13 preferably consists of two elongated, suitably rigid rods or wires 14. Each rod 14 is bent into a substantially U-shaped configuration having legs 15 and 16 and a curved portion 17. The legs 15 and 16 are preferably substantially parallel for the greater part of their lengths, but are crossed near their tips 18 and 19. As viewed in FIGS. 2 and 3, the legs 15 each have three portions, a portion 15b located above the legs 16, a transverse portion 15a and a portion 15 c located below the legs 16. The transverse portion 15a connects the portions 15b and 15c and is preferably substantially perpendicular to them.

The ring 11 is welded or otherwise suitably joined to the tips 18 of the legs 15. Similarly, the ring 12 is welded or otherwise suitably joined to the tips 19 of the legs 16.

The rods 14, as most clearly shown in FIG. 1, are preferably matched to each other such that the corresponding legs 15 of each of the rods 14 are substantially parallel and are preferably secured to each other at several points by welding or other suitable means. The corresponding legs 16 diverge slightly in the direction of their tips 19. The transverse portions 15a of the legs 15 project through the space created by this divergence of the legs 16.

The width of the divergence is just sufficient to permit the passage of the transverse portions 15a of the legs 15. With such a width, the legs 16 constrain the movement of the tranverse portions 15a of the legs 15 within the divergence and thereby align the rings 11 and 12. Because of this constraining action of the legs 16, a person using my strainer holder 10 does not have to manually align the rings 11 and 12.

Figure 5:
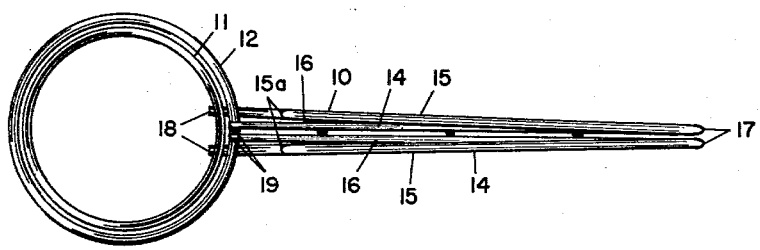
FIG. 5 is a top plan view of a third embodiment of my novel strainer holder.
Figure 6:
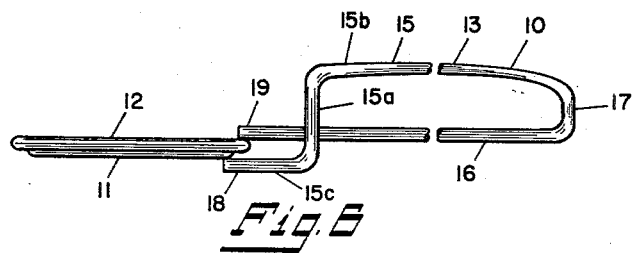
FIG. 6 is a side view of the holder of FIG. 5.

The relative position of the legs 15 and 16 may be reversed, as illustrated by the strainer holder 10 of FIGS. 5 and 6. Corresponding elements of the holders of FIGS. 1, 2, 5 and 6 carry the same reference numerals. In FIGS. 5 and 6, the legs 16 are the substantially parallel legs which are preferably secured to each other, while the legs 15 are the slightly diverging legs. In all other respects the embodiments of FIGS. 1 and 5 are identical.

The legs 16 of the strainer holder 10 of FIGS. 5 and 6 project through the space created by the divergence of the legs 15. In a manner similar to the constraining action of the legs 16 in the embodiment of FIG. 1, the legs 15 in the embodiment of FIGS. 5 and 6 constrain the movement of the legs 16 and thereby align the rings 11 and 12.

The spring effect of the curved portion 17 of each of the rods 14 tends to force the legs 15 and 16 apart. But because the transverse portions 15a place the tips 18 on the opposite side of legs 16 from the remaining portion of legs 15, the spring effect of the curved portion 17 biases the rings 11 and 12 attached to tips 18 and 19 into forceful engagement with each other. The engagement of the rings 11 and 12 prevents the legs 15 and 16 from springing any farther away from each other than the relative positions they occupy when the rings 11 and 12 meet. In effect, the rings 11 and 12 serve as a lock to constrain the movement apart of the legs 15 and 16. Or, more importantly for the purposes of my invention, the rings 11 and 12 are forced into close, pressing engagement with each other by the spring effect of the curved portion 17.

The insertion of a strainer into my new strainer holder 10 is fast and easy. The person using the holder 10 first grasps the handle 13 comfortably in his hand and squeezes the legs 15 and 16 toward each other. This action causes the rings 11 and 12 to move apart. Once the rings 11 and 12 are apart, the person inserts the strainer between them. He then releases the handle 13, thereby causing the rings 11 and 12 to spring together to firmly clamp the strainer between them.

Removal of an old strainer to insert a new one follows this same convenient procedure. The legs 15 and 16 are squeezed together to move the rings 11 and 12 apart. The old strainer is dropped, shaken or pulled out and a new one is inserted. Then the legs 15 and 16 are released to allow the rings 11 and 12 to tightly clamp the new strainer.

One advantage of the operation of my holder 10 is that a pocket or bag can be easily formed in a flexible strainer. The flexible strainer is first inserted in the holder 10 in the manner just described. The legs 15 and 16 are then lightly squeezed to remove some of the clamping pressure on the strainer. With the pressure slightly reduced, it is a simple matter for a person to form a pocket in the strainer with his fingers without pushing the strainer out of the holder 10.

Several variations in the design of the rings 11 and 12 for the holder 10 are possible. In the embodiment of FIGS. 1 and 2, the ring 11 is slightly smaller than the ring 12 and fits just inside the ring 12. This embodiment is advantageous for several reasons. It is economically manufactured. Further, it tightly holds almost any strainer, whether made of stiff or flexible material. Flexible strainers are folded into the narrow space between the rings 11 and 12 and are thereby securely bound. Stiff strainers are securely held by the clamping pressure exerted by the rings 11 and 12.

Figure 3:
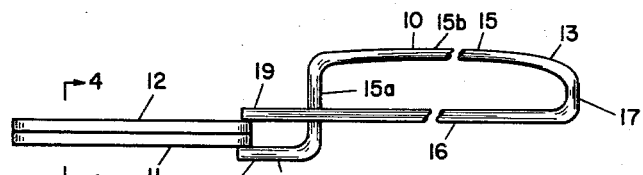
FIG. 3 is a side view of a second embodiment of my strainer holder.
Figure 4:
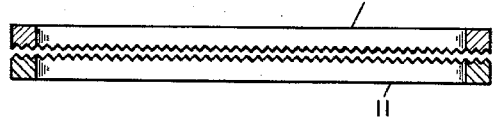
FIG. 4 is a section view taken along line 4—4 of FIG. 3.

In the embodiment of FIGS. 3 and 4, the rings 11 and 12 are approximately the same size and meet each other face to face. The clamping pressure resulting from this face to face engagement is sufficient to securely hold most strainer materials. If a further holding effect is needed, the engaging faces of the rings 11 and 12 may be flattened or serrated, as shown in FIG. 4. If desired, such serrations may also be added to the rings 11 and 12 of the embodiment of FIGS. 1 and 2.

My strainer holder 10 is designed particularly for use by sign painters, who typically strain small quantities of paint into small containers. It is, of course, equally suitable for any other straining operation. For example, laboratory workers can use it for straining or filtering operations. Whatever the operation, its advantages are clear. Manufacture is simple. The holder is compact and may be conveniently stored or carried. Most importantly, strainers can be easily replaced. A simple squeeze of the handle 13 is all that is required to remove an old strainer and insert a new one. Furthermore, my holder can be used with almost any type of strainer, whether cloth, paper, wire or whatever.

It is understood that my invention is not confined to the particular construction and arrangement of parts herein illustrated and described, but embraces all such modified forms thereof as come within the scope of the following claims.

I claim:

1. A holder for a strainer comprising a first ring, a second ring and a handle, said handle comprising a pair of matching, substantially U-shaped wires each having a curved portion and first and second legs, each of said legs having a tip end, said first legs extending in spaced relation to each other and diverging slightly in the direction of their tips to form an opening, said second legs being secured to each other in substantially parallel relation and having transverse portions near their tips which extend through said opening such that their tips are on the opposite side of said first legs from the major portion of said second legs, said transverse portion being constrained from substantial lateral movement within said opening by said first legs, said curved portions of said handle having a spring effect which tends to force the major portions of said legs apart and the tips of said first and second legs together, said first and second rings being secured to the tip ends of said first and second legs, respectively, said rings being adapted to be forced together when said tip ends are forced together to engage a strainer between said rings in fixed relation.

2. A holder for a strainer comprising a first ring, a second ring and a handle, said handle comprising a pair of matching, substantially U-shaped wires each having a curved portion and first and second legs, each of said legs having a tip end, said first legs having transverse portions near their tips and extending in spaced relation to each other and diverging slightly in the direction of their tips to form an opening between said transverse portions, said second legs being secured to each other in substantially parallel relation and extending through said opening, said second legs being constrained from substantial lateral movement within said opening by said transverse portions, the tips of said first legs being on the opposite side of said second legs from the major portions of said first legs, said curved portion of said handle having a spring effect which tends to force the major portions of said first and second legs apart and the tips of said first and second legs together, said first and second rings being secured to the tip ends of said first and second legs, respectively, said rings being adapted to be forced together when said tip ends are forced together to engage a strainer between said rings in fixed relation.

References Cited by the Examiner

UNITED STATES PATENTS

| 307,080 | 10/84 | Badger | 294—99 X |
| 385,498 | 7/88 | Brinton | 294—33 X |
| 1,080,898 | 12/13 | Dennis | 294—99 X |
| 2,621,068 | 12/52 | Whitmarsh | 294—99 |

FOREIGN PATENTS

| 462,614 | 7/28 | Germany. |

SAMUEL F. COLEMAN, *Primary Examiner.*
ERNEST A. FALLER, *Examiner.*